(12) United States Patent
Rädlinger et al.

(10) Patent No.: US 6,508,276 B2
(45) Date of Patent: Jan. 21, 2003

(54) TEXTILE TUBING

(75) Inventors: Josef Rädlinger, Cham (DE); Horst Stimmelmayr, Cham (DE); Frank Heinze, Königs-Wusterhausen (DE); Frank-Michael Köpping, Leipzig (DE)

(73) Assignee: Radlinger Maschinen-und Anlagenbau GmbH, Cham-Windischbergerdorf (DE)

( * ) Notice: Subject to any disclaimer, the term of this patent is extended or adjusted under 35 U.S.C. 154(b) by 0 days.

(21) Appl. No.: 10/085,751

(22) Filed: Feb. 28, 2002

(65) Prior Publication Data

US 2002/0162597 A1 Nov. 7, 2002

Related U.S. Application Data

(63) Continuation of application No. PCT/EP00/08519, filed on Aug. 31, 2000.

(30) Foreign Application Priority Data

Sep. 1, 1999 (DE) .......................... 199 41 669

(51) Int. Cl.⁷ ............................................. F16L 11/112
(52) U.S. Cl. ........................ 138/125; 138/124; 138/153
(58) Field of Search .................. 138/125, 153, 138/123, 124

(56) References Cited

U.S. PATENT DOCUMENTS

| | | | |
|---|---|---|---|
| 1,775,334 A | * 9/1930 | Wanamaker | 138/125 |
| 1,972,523 A | * 9/1934 | Kennedy | 138/125 |
| 3,669,157 A | * 6/1972 | Woodall, Jr. et al. | 138/123 |
| 3,881,522 A | * 5/1975 | Lewis et al. | 138/144 |
| 4,576,205 A | 3/1986 | Morinaga et al. | 138/98 |
| 4,680,213 A | * 7/1987 | Fourezon | 428/105 |
| 4,681,783 A | 7/1987 | Hyodo et al. | 428/36 |
| 4,684,556 A | 8/1987 | Ohtsuga et al. | 428/36 |
| 4,802,510 A | * 2/1989 | Berlincourt et al. | 138/125 |
| 4,803,103 A | * 2/1989 | Pithouse et al. | 138/123 |
| 5,164,237 A | 11/1992 | Kaneda et al. | 428/34.7 |
| 5,271,433 A | 12/1993 | Schwert et al. | 138/98 |
| 5,551,484 A | 9/1996 | Charboneau | 138/104 |
| 5,843,542 A | * 12/1998 | Brushafer et al. | 138/123 |
| 5,855,712 A | 1/1999 | Toyoda et al. | 156/94 |

FOREIGN PATENT DOCUMENTS

| | | |
|---|---|---|
| CA | 2066813 | 10/1992 |
| EP | 310860 A1 | 4/1989 |
| EP | 510784 A1 | 10/1992 |

OTHER PUBLICATIONS

International Search Report dated Jan. 17, 2001, in PCT/EP00/08519.
International Preliminary Examination Report (Germanlanguage) dated Nov. 19, 2001, in PCT/EP00/08519.
English–language translation of International Preliminary Examination Report dated Nov. 19, 2001, in PCT/EP00/08519.

* cited by examiner

Primary Examiner—James Hook
(74) Attorney, Agent, or Firm—Marshall, Gerstein & Borun

(57) ABSTRACT

A textile tubing comprises inner and outer coatings, and a material made of warp and weft threads manufactured from high tensile strength and high modular strength fibers (high performance fibers) disposed between the coatings. The warp threads are arranged in the longitudinal direction of the tubing and the weft threads are arranged in the circumferential direction of the tubing. The inner and outer coatings are made of a thermolastic synthetic material. The weft thread width is at least 8,000 decitex (dtex) and, preferably, more than 10,000 dtex. The warp thread width is at least 2,000 dtex and, preferably, more than 3,000 dtex. The weft density is at least 40 and preferably more than 50. The textile tubing is especially suitable for cleaning high pressure liquid lines. The textile tubing does not have to be stuck to large surface areas of the inner wall of a pipe due to its high burst pressure of more than 90 bar. The nominal pressure of the old pipes can be substantially increased by the cleaning procedure.

11 Claims, 1 Drawing Sheet

TEXTILE TUBING

CROSS-REFERENCE TO RELATED APPLICATION

Priority benefit under 35 U.S.C. §120 of continuation co-pending international application No. PCT/EP00/08519 filed Aug. 31, 2000, is claimed.

BACKGROUND OF THE DISCLOSURE

1. Field of the Disclosure

The present invention relates to a textile tubing and in particular to a textile hose for the renovation of pipe lines with high nominal pressure.

2. Brief Description of Related Technology

For the renovation of high-pressure pipes, for example gas or water pipes, the textile hose relining method is used. A textile hose—called an inliner—with a resin-impregnated inner layer is inserted by turning inside-out, into the pipe to be renovated, so that the resin-impregnated layer is now on the outside. By applying the hose with pressure the resin-impregnated outer layer is bonded to the inner surface of the fluid pipe line. Pipes in need of repair can be renovated in this way.

The renovation hose consists of a tubular fabric and an impermeable inner coating which in the case of gas pipes is generally polyester or polyurethane and in the case of water pipes is generally flexible polyethylene. The fabric itself consists of polyester fibers.

Such textile hoses are known from the prior art in many embodiments.

Reference is made, for example, to U.S. Pat. No. 5,271,433 or EP 0 510 784. Known from both these documents is a hose for lining pressure lines with an inner coating of a thermoplastic material, for example polyurethane, a fabric consisting of weft and warp threads and an outer layer, so that the fabric is embedded between the inner and outer layers.

Other textile hoses also bonded to an inner surface of a pipe using the turning-inside-out-method are described, for example, in U.S. Pat. Nos. 4,684,556 and 4,576,205.

U.S. Pat. No. 5,855,712 describes a new method for introducing textile hoses of the type in question into the pipe by turning inside-out.

Known from EP 0 310 860 A1 are textile hoses for low-temperature applications made of polyacrylic fibers.

Although high-pressure fluid pipe lines can be reliably repaired with these known textile hoses, they nevertheless suffer from a number of disadvantages:

Textile hoses used hitherto to repair high-pressure fluid pipe lines are designed for a maximum nominal pressure of up to 16 bar, because the polyester textile does not have sufficient material strength to withstand nominal pressures above 30 bar. Even at lower nominal pressures of, for example, 4 to 12 bar the renovation hose requires radial support from the old pipe.

The renovation hose must be bonded to the old pipe in a tight, close-fitting and planar manner. Clean and reliable bonding requires extremely costly pre-processing of the metal surface of the inside of the old pipe (clean, sandblast, deburr), processes entailing very high cost.

Because of the material used, the renovation hose has poor gas-impermeability. For this reason bonding faults give rise to gas pressure build-up between pipe and hose, which can cause detachment of the renovation hose.

The insertion of the renovation hose into the old pipe by the turning-inside-out-method using compressed air and reversion chamber restricts the length of the repair to not more than 250 meters (m).

Furthermore, it is often desirable when repairing a high-pressure fluid line to be able to increase its nominal pressure. This is prevented by the fact that textile hoses known hitherto permit a maximum nominal pressure of 16 bar, since the burst pressure of the textile hose is approximately 4 to 40 bar, depending on construction and diameter. Renovation of high-pressure fluid lines which would permit a nominal pressure of over 30 bar after renovation is therefore not possible.

It is therefore desirable to configure a textile hose in such a way that the above-described problems and disadvantages of known textile hoses are eliminated.

SUMMARY OF THE DISCLOSURE

A textile hose with a textile formed of warp and weft threads made of fibers of high tensile strength and high modular strength (high-performance fibers), the warp threads being arranged in the longitudinal direction of the hose and the weft threads in the circumferential direction of the hose, and with an internal and an external coating of thermoplastic material, the textile being disposed between said coatings, and the thickness of the weft threads being at least 8,000 decitex (dtex) and preferably more than 10,000 dtex.

Such a textile hose is able to withstand very high pressures. Even with a diameter of, for example, 150 millimeters (mm), burst pressures of over 100 bar are attained. Because the textile made of high-performance fibers carries all the pressure forces of the medium (fluid) to be transported, the textile hose does not require the old pipe to perform any support function and thereby makes possible a renovation in combination with an increase of the nominal pressure of existing pipes.

Additional features of the disclosure may become apparent to those skilled in the art from a review of the following detailed description, taken in conjunction with the drawing figures and the appended claims.

BRIEF DESCRIPTION OF THE DRAWING FIGURES

For a complete understanding of the disclosure, reference should be made to the following detailed description and accompanying drawings wherein.

Figure 1:
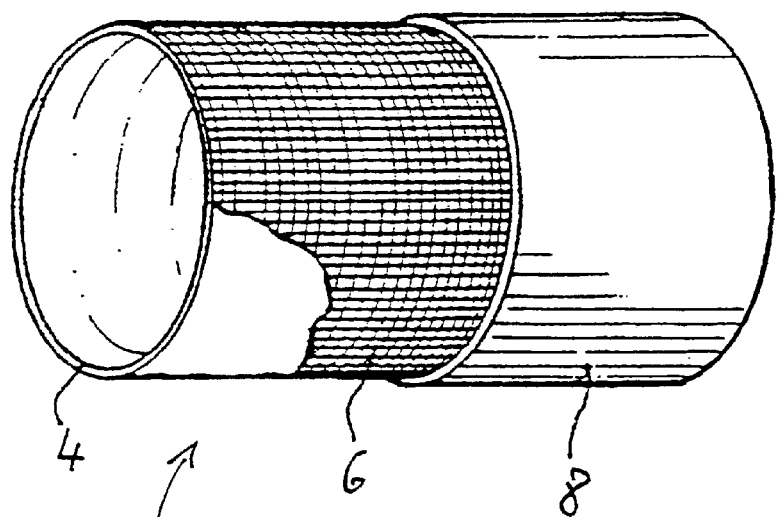
FIG. 1 illustrates a partially cut-away perspective view through one embodiment of a textile hose according to the invention.

While the disclosed product and method are susceptible of embodiment in various forms, there is illustrated in the drawing figures and will hereafter be described specific embodiments of the disclosure, with the understanding that the disclosure is intended to be illustrative, and is not intended to limit the disclosure to the specific embodiments described and illustrated herein.

DETAILED DESCRIPTION OF THE PREFERRED EMBODIMENTS

A textile hose with a textile formed of warp and weft threads of high-strength and high-modulus fibers (high-performance fibers), the warp threads being arranged in the longitudinal direction of the hose and the weft threads in the circumferential direction of the hose, and with an internal and an external coating of thermoplastic material, the textile being disposed between said coatings and the weft thread thickness being at least 8,000 decitex (dtex) and preferably more than 10,000 dtex. Furthermore, the weft density value is at least 40 and preferably more than 50 and the warp thread thickness is at least 2,000 dtex and preferably more than 3,000 dtex. Such a textile hose is especially suited to renovating high-pressure fluid lines. Because of its high burst pressure of more than 90 bar it does not require planar bonding to the inner surface of the pipe. In addition, the nominal pressure of the old pipe can be significantly increased by the renovation.

As shown in FIG. 1 a textile hose according to the invention has in cross-section a triple-layer structure comprising an inner coating 4, a textile fabric 6 and an outer coating 8. The inner coating 4 has high impermeability and high resistance with respect to the medium to be transported. In addition it protects the textile 6 on the inside of the hose. A possible material for the inner coating is a flexible thermoplastic material with or without filler. In the case of gas pipes thermoplastic polyurethane, flexible polyamide, thermoplastic polyester or polyether-ester, for example, are suitable. In the case of water pipes flexible polyethylene is preferably used.

The outer coating 8 has the function of protecting the textile 6 from influences from outside. These include, in particular, the mechanical strain during insertion of the hose and protection against degradation through, for example, humidity and microorganisms. A flexible thermoplastic material with or without filler is preferably used as the material for the outer coating 8. Depending on the application and the surface properties of the surrounding inner surface of the pipe to be renovated, polyethylene (m-LLD-PE, LLD-PE, LD-PE and MD-PE), polypropylene, thermoplastic polyurethane or plasticized PVC, for example, can be used for this coating.

The textile 6 is the principal item in the textile hose 2 for renovating pressure pipes with high nominal pressure. The textile 6 is woven on a circular loom from weft threads 10 and warp threads 12. The weft threads 10 are arranged in the circumferential direction of the textile hose 2 and the warp threads 12 in the longitudinal direction of the hose 2. High-strength and high-modulus fibers (high-performance fibers) with high thread thickness and high weave density, in particular high weft density, are used for the weft and warp threads. The hose 2 is thereby given high resistance to pressure, i.e. even with a diameter of e.g. 150 mm the hose 2 has a burst pressure of over 100 bar. High-strength and high-modulus fibers, e.g. aramide fibers, aramide copolymer fibers, carbon fibers, glass fibers, PBO fibers (Zylon®) or crystalline PE fibers (Dyneema®) are used as fibers for the weft and warp yarns 10 and 12.

When manufacturing the textile 6 on a circular loom, a regular twill weave type being preferred, the weft yarn thickness should be at least 8,000 dtex and preferably more than 10,000 dtex in order to obtain the results sought according to the invention. The value of the warp thread thickness is less critical; however, it should be at least 2,000 dtex and preferably more than 3,000 dtex.

A further parameter by which the pressure resistance of the textile hose can be adjusted is the so-called weft density, i.e. the number of weft threads per 10 centimeters (cm). This weft density value is at least 40 and preferably more than 50 with the above-mentioned thread thicknesses of preferably more than 10,000 dtex for the weft threads 10 and of preferably more than 3,000 dtex for the warp threads 12.

The fibers for the weft threads 10 and the warp threads 12 preferably have a modulus of elasticity of at least 50 gigapascals (Gpa) and a tensile strength of more than 2 GPa.

Figure 2A:
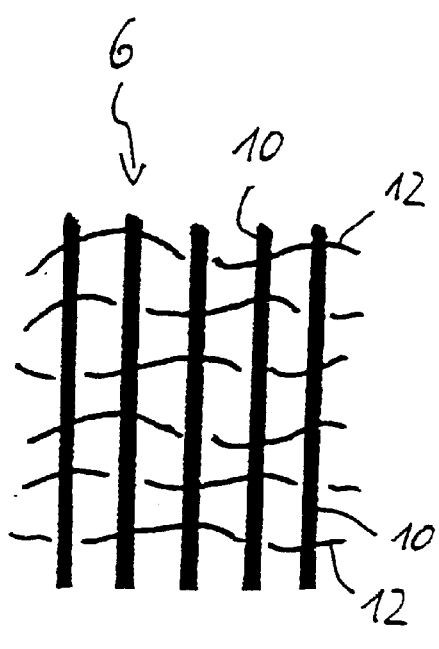
FIG. 2A illustrates a structure of the textile in a first embodiment.
Figure 2B:
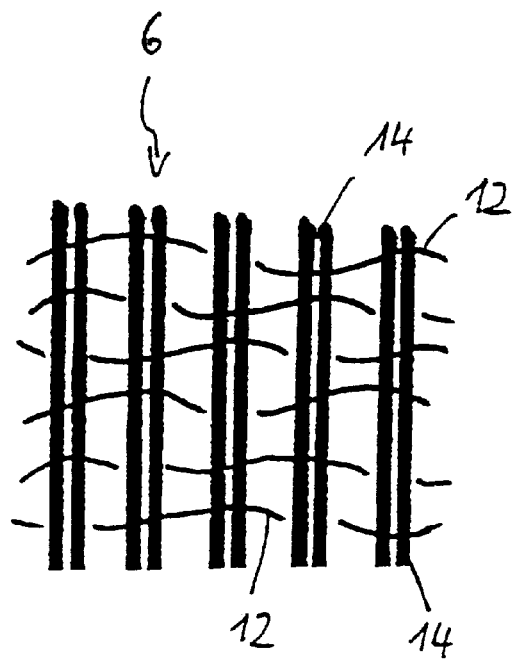
FIG. 2B illustrates the structure of the textile in a second embodiment.

As can be seen in FIG. 2B, it is also possible to weave the textile 6 with double weft threads 14. In this connection, reference is made to EP 0 535 203, the disclosure of which is hereby incorporated by reference, in which a circular loom with continuous heddle motion, produces a textile 6 of particularly high quality. Using a special weaving blade and a shuttle with two weft spools it is possible with this known circular loom to weave with two closely adjacent, parallel weft threads 14 as shown in FIG. 2B. Depending on the thread thickness the weft density is thereby increased by up to 50%, giving rise to a marked increase in the burst pressure.

Because of its high resistance to pressure (burst pressure>100 bar), the textile hose 2 does not require the old pipe to perform any support function, thereby making it possible to renovate an old pipe in combination with an increase of the nominal pressure of existing pipes. In other words, the defined nominal pressure of the textile hose 2 is higher than the nominal pressure of the old fluid pipe, so that it is possible to increase the nominal pressure of existing pipes without using the old fluid pipe for radial support.

Because the textile hose 2 according to the invention does not require the support function of the old host pipe or fluid pipe line. unlike renovation hoses known hitherto it is not bonded to the old pipe. Nor does the hose according to the invention come into close-fitting contact with the inner circumferential wall of the old fluid pipe or require its supporting strength. As it is therefore possible to insert the textile hose 2 simply into an existing old fluid line without needing to use the turning-inside-out-method, substantially greater renovation lengths are possible as compared to those permitted by textile hoses used hitherto.

The following table summarizes data relating to a known textile hose and to the two embodiments of the textile hose illustrated in FIGS. 2A and 2B:

|  | Known textile hose | Textile hose according to FIG. 2A | Textile hose according to FIG. 2B |
| --- | --- | --- | --- |
| Internal coating | Polyester | Polyurethane | Polyurethane |
| External coating | None | Polyurethane | Polyurethane |
| Textile fiber | Polyester | Aramide | Aramide |
| Warp thread thickness | No data | 10,000 dtex | 10,000 dtex |
| Weft thread thickness | No data | 15,000 dtex | 15,000 dtex |
| Weft density | 40 | 42 | 66 |
| Weave type | Linen texture | Regular twill | Regular twill |
| Burst pressure at diameter | 13 bar at DN 400 mm | 90 bar at DN 170 mm | 110 bar at DN 170 mm |
| Gas-impermeability (methane) | approx. 10.0 cm$^3$/ (h*bar*m$^2$) | 1.7 cm$^3$/ (h*bar*m$^2$) | 1.7 cm$^3$/ (h*bar*m$^2$) |
| Max. repair length | 250 m | 2,000 m | 2,000 m |

The foregoing description is given for clearness of understanding only, and no unnecessary limitations should be understood therefrom, as modifications within the scope of the disclosure may be apparent to those having ordinary skill in the art.

What is claimed is:

1. A textile hose comprising:
   (a) an internal thermoplastic coating;

(b) an external thermoplastic coating; and,
(c) a textile disposed between the inner and outer coatings, the textile made of high-strength and high-modulus fibers comprising:
  (i) warp threads arranged in a longitudinal direction of the hose; and,
  (ii) weft threads arranged in a circumferential direction of the hose, the weft threads having a thickness of at least 8,000 dtex.

2. The textile hose of claim 1, the weft threads having a thickness of at least 10,000 dtex.

3. The textile hose of claim 1, wherein the warp threads have a thickness, and the thickness of the weft threads is greater than the thickness of the warp threads.

4. The textile hose of claim 1, wherein the weft threads have a weft density of at least 40.

5. The textile hose of claim 4, wherein the weft threads have a weft density of at least 50.

6. The textile hose of claim 1, wherein the warp threads have a thickness of at least 2,000 dtex.

7. The textile hose of claim 6, wherein the warp threads have a thickness of at least 3,000 dtex.

8. The textile hose of claim 1, wherein the high-strength and high-modulus fibers have a modulus of elasticity of at least 50 GPa.

9. The textile hose of claim 1, wherein the high-strength and high-modulus fibers have a tensile strength of at least 2 GPa.

10. The textile hose of claim 1, wherein the high-strength and high-modulus fibers are constructed of materials selected from the group consisting of aramide, aramide copolymer, carbon, glass fiber, PBO, crystalline PE, and mixtures thereof.

11. A method of laying a textile hose having a first, nominal pressure in a previously-laid pipe having a second, nominal pressure, the method comprising the step of inserting the textile hose into the previously-laid pipe, the first nominal pressure being greater than the second, nominal pressure, said textile hose comprising:
(a) an internal thermoplastic coating;
(b) an external thermoplastic coating; and,
(c) a textile disposed between the inner and outer coatings, the textile made of high-strength and high-modulus fibers comprising:
  (i) warp threads arranged in a longitudinal direction of the hose; and,
  (ii) weft threads arranged in a circumferential direction of the hose, the weft threads having a thickness of at least 8,000 dtex.

* * * * *